UNITED STATES PATENT OFFICE.

WILLIAM McALLISTER, OF GERRY, NEW YORK.

IMPROVEMENT IN MANUFACTURE OF CHEESE.

Specification forming part of Letters Patent No. 30,638, dated November 13, 1860.

*To all whom it may concern:*

Be it known that I, WM. MCALLISTER, of Gerry, in the county of Chautauqua and State of New York, have invented a new and useful Improvement in Making Cheese; and I do hereby declare that the following is a full and exact description thereof.

The nature of my invention consists in the discovery of the use of sour whey in combination with rennet and brine in making cheese for the purpose of rendering the curd susceptible for the whey to escape sufficiently in the operation of pressing, thereby preventing rancidity and other damage in curing, and for improving the quality of the cheese in other respects, and saving a portion of the rennet that would be required when sour whey is not used.

To enable others skilled in the art to make and use my invention, I will proceed to describe the mode of its construction, use, and operation.

First, according to my discovery it should be understood that it is necessary that a certain effect in the condition of the milk and curd, in addition to that produced by the rennet, should take place during the process of making cheese, in order to render the curd of a proper consistence for the whey to escape sufficiently in pressing, which effect may be produced by application to the milk of sour whey or its equivalent in other substances or means; but this effect should be produced in such a manner that the curd or the whey will not become perceivably sour in the least degree before the curd is put to press. In order to produce this effect safely and at the proper time, I adopt the general mode of surrounding the milk with cold water during the night in order to keep it cool and perfectly sweet until the time to warm it up for applying the rennet. Then about ten or fifteen minutes before putting in the rennet I stir evenly into the milk a quantity of sour whey, generally in the proportion of about five quarts to a quantity of milk that will make one hundred pounds of cheese. For this purpose I keep a pail of sour whey and put into the milk each morning about two-thirds of the quantity in the pail, and add each day the same quanity of new whey to the remaining quantity in the pail for use the next day, thus renewing it that it may not become too sour or rancid in the least. The settlings in the bottom of the pail should be frequently thrown out and the pail cleansed; but by the use of sour whey I am availed of the advantage that it requires about a third or fourth less rennet to coagulate the milk sufficient for "breaking up" the curd in about one hour from the time the rennet is put in than it would if no sour whey were used. There being no regular definite gage in the use of sour whey in making cheese, it therefore must be regulated by the experience and observation of the dairyman, according to the weather, state of the milk, &c.; and, if there should be danger from accident or any cause of the cheese becoming sour before made, there should be less sour whey used, or perhaps not any; also, when cows are fed on hay or other dry feed, the milk being of a different nature thereby, less sour whey should be used than where the cows have fresh pasture; but it is very uncertain and unsafe to depend on any regulation for the production of the desired effect on the milk and curd without the use of sour whey or some extraneous agent for the purpose, for there will be continual danger without its use to variation from the proper degree of effect either to one side or the other. Either the curd will remain in a quaggy state and not work down readily to the proper consistence that the whey can be got out, or, on the other hand, the cheese will become sour and thereby greatly damaged; but by my method in the use of sour whey, the milk being kept thoroughly sweet until the proper time for the desired effect to begin to take place, the sour whey is then applied, which will cause the curd to work down much more readily and effectually than if it is not used, and thereby the desired result can be safely and uniformly produced.

My improvement in the use of sour whey may be used to advantage in connection with any of the usual modes of making cheese practiced in the United States, the object of its use being simply the peculiar chemical effect that it has, in connection with the rennet, to combine and collect the curd and separate the whey therefrom, and to more effectually shrink down and harden or otherwise render the consistence of the particles of curd more susceptible for the whey to escape in the operation of pressing the cheese.

My test to distinguish a good curd and when the proper effect has taken place is when it appears firm and dry, the particles having a smooth, yellow, rich appearance, and will squeak slightly in the teeth when chewed at the time it is scalded sufficiently, and considerably more after the brine is applied thereto.

Second, in addition to the use of sour whey in making cheese, I apply a brine to the curd instead of applying dry salt, as is now practiced, to produce a more thorough extraction of the whey from the cheese, and for other purposes hereinafter described, which brine I think preferable to to be made with pure soft water warmed to about blood-heat, and adding a trifle more salt than the water will dissolve. I then let it stand to settle, and before using remove the scum that rises to the top, then pour off the brine carefully into the curd, leaving the sediment at the bottom, thus removing much of the impurities of the salt. I commonly use about two and a half gallons of brine to one hundred pounds of cheese. The whey should be drained as dry as practicable from the curd before the brine is applied. I let the curd stand in the brine from one to three hours, according to the firmness and dryness of the curd. If the curd appears too soft and the whey not likely to escape freely, I then let it stand longer in the brine. Generally I let it stand one and a half hour in warm weather, and about one hour when the weather is cool. The brine for the purposes described may be made by dissolving the salt in whey or water or its equivalent in other liquids; but I think water will generally be found preferable, for I have found that a given quantity of water will dissolve over one-third more salt than the same quantity of whey. Hence dissolving the salt in water forms the strongest solution, which penetrates the curd more thoroughly, and also, it having a diluting effect on the whey, causes it to escape more freely.

Another advantage of using brine applied to the curd, instead of dry salt, is it forms a gage by which a sufficiently strong solution of salt can be apppplied to the curd without the danger that undissolved salt may remain in the cheese, thereby causing it to become too salt, and also avoiding the danger that the salt may become too much diluted in the whey that remains in the curd, and thereby not having the proper effect on the curd and leaving the cheese not sufficiently salted.

By the use of sour whey and brine in the manufacture of cheese according to my method I think it is not generally necessary to press more than twenty-four hours if the press is heavy; and if the cheese is properly made and attended to it will stand straight on the counter, and not crack, puff, or leak, causing but little labor and care while curing, and forming the best quality of sweet good-flavored cheese.

What I claim as my invention, and desire to secure by Letters Patent, is—

The use of sour whey in combination with rennet, as and for the purposes herein set forth, and in connection therewith the use of brine, in the manner and at the period in the process of making cheese, for the purposes set forth.

WM. McALLISTER.

Witnesses:
  OBED EDSON,
  JOHN McALLISTER, Jr.